United States Patent
Kabasin

(10) Patent No.: US 8,924,128 B2
(45) Date of Patent: Dec. 30, 2014

(54) FUEL INJECTOR CONTROL SYSTEM AND METHOD TO COMPENSATE FOR INJECTOR OPENING DELAY

(75) Inventor: Daniel F. Kabasin, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 563 days.

(21) Appl. No.: 13/109,405

(22) Filed: May 17, 2011

(65) Prior Publication Data

US 2012/0296551 A1 Nov. 22, 2012

(51) Int. Cl.
| | |
|---|---|
| F02D 28/00 | (2006.01) |
| F02D 41/30 | (2006.01) |
| F02D 41/00 | (2006.01) |
| F02D 41/34 | (2006.01) |
| F02M 21/02 | (2006.01) |
| F02D 19/02 | (2006.01) |
| F02D 41/20 | (2006.01) |

(52) U.S. Cl.
CPC ............ *F02D 41/0027* (2013.01); *F02D 41/34* (2013.01); *F02M 21/0263* (2013.01); *F02D 19/024* (2013.01); *F02D 19/027* (2013.01); *F02D 19/025* (2013.01); *F02D 2041/2055* (2013.01); *F02D 2041/2058* (2013.01); *F02D 2200/0602* (2013.01); *Y02T 10/44* (2013.01); *Y02T 10/32* (2013.01)
USPC .......................................... 701/103; 123/299

(58) Field of Classification Search
USPC .......... 701/102–104, 112; 123/294, 299, 445, 123/478–480, 490; 361/115, 144, 152, 160
See application file for complete search history.

(56) References Cited

U.S. PATENT DOCUMENTS

| | | | | |
|---|---|---|---|---|
| 5,701,870 | A * | 12/1997 | Gottshall et al. | 123/490 |
| 5,908,022 | A * | 6/1999 | Aoki et al. | 123/568.16 |
| 6,836,721 | B2 * | 12/2004 | Stevens | 701/104 |
| 7,003,393 | B2 * | 2/2006 | Stevens | 701/103 |
| 7,822,537 | B2 * | 10/2010 | Perryman et al. | 701/114 |
| 2004/0057189 | A1 * | 3/2004 | Cheever et al. | 361/160 |
| 2005/0119819 | A1 * | 6/2005 | Stevens | 701/104 |
| 2007/0080606 | A1 * | 4/2007 | Hardy et al. | 310/316.03 |
| 2007/0282516 | A1 * | 12/2007 | Bowling et al. | 701/102 |
| 2008/0147293 | A1 * | 6/2008 | Remele et al. | 701/102 |
| 2008/0228374 | A1 * | 9/2008 | Ishizuka et al. | 701/103 |
| 2009/0055084 | A1 * | 2/2009 | Ishizuka et al. | 701/105 |
| 2009/0063010 | A1 * | 3/2009 | Nakata et al. | 701/103 |
| 2009/0063012 | A1 * | 3/2009 | Nakata et al. | 701/103 |
| 2009/0063013 | A1 * | 3/2009 | Nakata et al. | 701/103 |
| 2009/0121724 | A1 * | 5/2009 | Perryman et al. | 324/522 |
| 2009/0228190 | A1 * | 9/2009 | Loeffler et al. | 701/103 |
| 2009/0312935 | A1 * | 12/2009 | Song et al. | 701/103 |
| 2009/0319157 | A1 * | 12/2009 | Ishizuka | 701/106 |

(Continued)

OTHER PUBLICATIONS

U.S. Appl. No. 13/069,862, filed Mar. 23, 2011.

*Primary Examiner* — John Kwon
*Assistant Examiner* — Johnny H Hoang
(74) *Attorney, Agent, or Firm* — Lawrence D. Hazelton

(57) ABSTRACT

A fuel injector control system including a fuel injector, a sensing device configured to provide a transition signal indicative of a fuel injector transition from the closed-state to the open-state, and a controller configured to determine an injector control signal based on the transition signal. The injector control signal closing time can be adjusted base on the transition signal and so compensate for injector opening delay due to, for example, a stuck closed fuel injector, cold temperatures, or low injector drive voltages.

17 Claims, 3 Drawing Sheets

(56) References Cited

U.S. PATENT DOCUMENTS

| | | | |
|---|---|---|---|
| 2010/0012090 A1* | 1/2010 | Lewis, III | 123/445 |
| 2010/0042308 A1* | 2/2010 | Kobayashi et al. | 701/104 |
| 2010/0049411 A1* | 2/2010 | Matsunaga et al. | 701/52 |
| 2010/0131160 A1* | 5/2010 | Ayabe et al. | 701/54 |
| 2010/0212640 A1* | 8/2010 | Lucido et al. | 123/516 |
| 2010/0262346 A1* | 10/2010 | Matsunaga et al. | 701/68 |
| 2010/0274462 A1* | 10/2010 | Wang et al. | 701/102 |
| 2011/0010077 A1* | 1/2011 | Kaneko et al. | 701/104 |
| 2011/0100327 A1* | 5/2011 | Nakagawa et al. | 123/445 |

* cited by examiner

US 8,924,128 B2

FUEL INJECTOR CONTROL SYSTEM AND METHOD TO COMPENSATE FOR INJECTOR OPENING DELAY

TECHNICAL FIELD OF INVENTION

The invention generally relates to fuel injector control systems and methods, and more particularly relates to a system and method for detecting a transition time when a fuel injector transitions from a closed-state to an open-state.

BACKGROUND OF INVENTION

Fuel injectors in internal combustion engines are generally operated by alternately switching the fuel injector between a closed-state where no fuel is dispensed by the fuel injector, and an open-state where fuel is dispensed by the fuel injector. It has been observed that some fuel injectors may stick and remain closed for an indefinite period of time after a signal to open the fuel injector has been applied to the fuel injector. This problem is particularly evident if it is the first time the injector is being opened after being in the closed-state for an extended period of time, for example, when a vehicle is parked over-night with the engine off. It has been observed that certain injector designs, such as compressed natural gas (CNG) injectors that use an elastomer to better seal a pintle/seat interface, are more susceptible to sticking than metal-to-metal type seals. Also, it has been observed that some fuel injectors are more susceptible to sticking if the ambient temperatures are relatively low, for example less than –20 degrees Celsius. If a fuel injector does not transition from the closed-state to the open-state predictably, the amount of fuel dispensed by the injector may be uncertain.

SUMMARY OF THE INVENTION

In accordance with one embodiment of this invention, a fuel injector control system is provided. The system includes a fuel injector, a sensing device and a controller. The fuel injector is configured to respond to a control signal for operating the fuel injector to a closed-state and an open-state. The sensing device is configured to provide a transition signal indicative of a fuel injector transition from the closed-state to the open-state. The controller is configured to determine the control signal based on the transition signal.

In another embodiment of the present invention, a controller for controlling a fuel injector is provided. The controller includes a control signal output, a sensor signal input, and a processor. The control signal output is configured to output a control signal for operating the fuel injector to a closed-state and an open-state. The sensor signal input is configured to receive a transition signal indicative of a fuel injector transition from the closed-state to the open-state. The processor is configured to determine the control signal based on the transition signal.

In yet another embodiment of the present invention, a method of controlling a fuel injector is provided. The method includes the step of outputting a control signal to operate the fuel injector to a closed-state and an open-state. The method also includes the step of receiving a transition signal indicative of a fuel injector transition from the closed-state to the open-state. The method further includes the step of adapting the control signal based on the transition signal.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
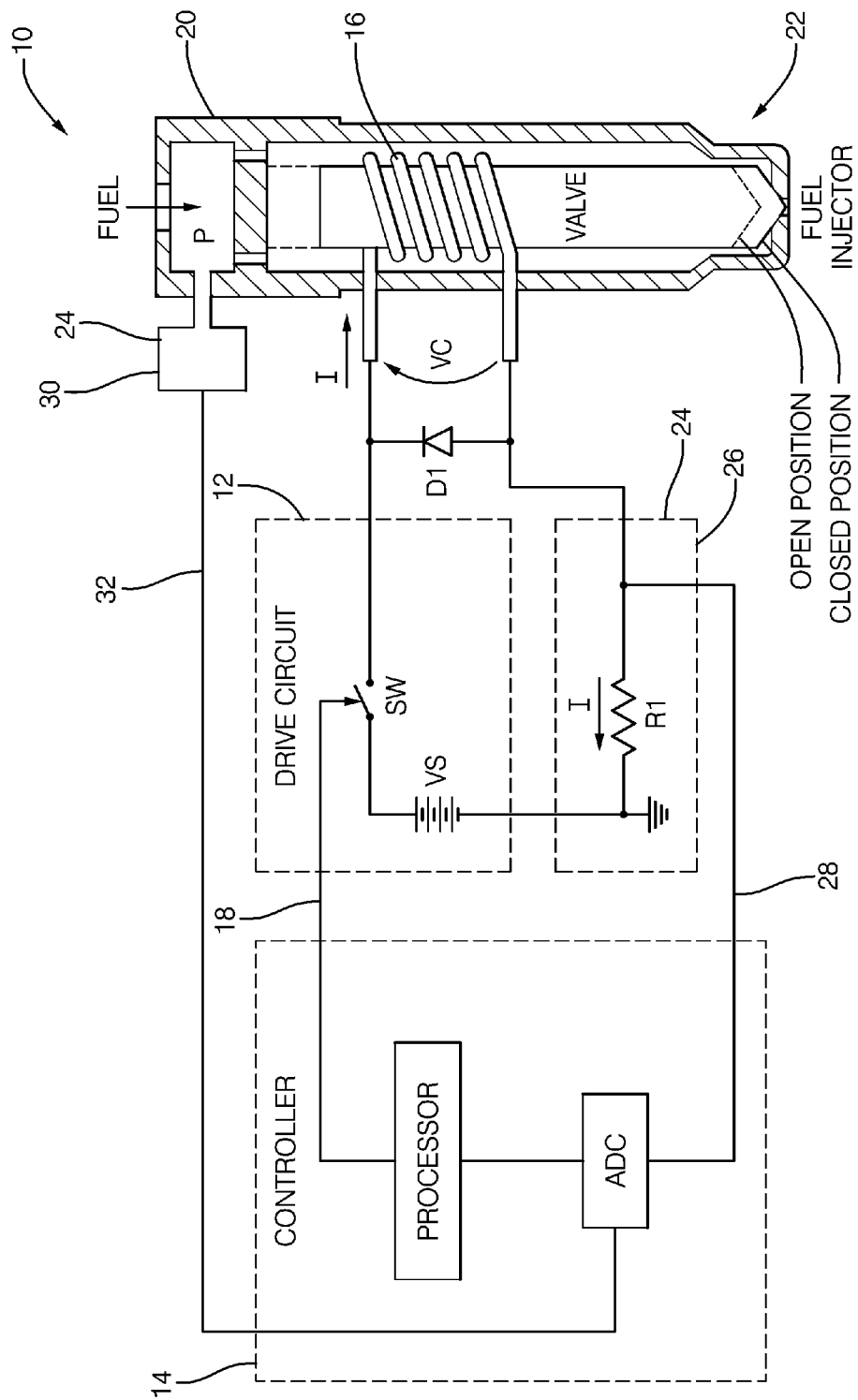
FIG. 1 is a schematic diagram of a fuel injector system in accordance with one embodiment.

In accordance with an embodiment of a fuel injector control system, FIG. 1 illustrates a system 10 that includes a drive circuit 12 and a controller 14 electrically coupled to a fuel injector 20. The fuel injector is generally configured to operate in response to a control signal 18 from the drive circuit 12 for operating the fuel injector to a closed-state where no fuel is dispensed by the fuel injector 20, and an open-state where fuel is dispensed by the fuel injector 20. In this non-limiting example, the fuel injector 20 illustrated is an electromagnetic type that operates a valve or pintle/seat arrangement 22 between an open-state corresponding to an open position as illustrated, and a closed-state corresponding to a closed position as illustrated. The open position allows fuel to be dispensed by the fuel injector 20, and the closed position blocks fuel from being dispensed by the fuel injector 20. While only one fuel injector 20 is illustrated, the teachings herein may be applied to systems having multiple fuel injectors, as will be described in more detail below.

FIG. 1 further illustrates a non-limiting example of a drive circuit 12 suitable for operating the fuel injector 20. The drive circuit is illustrated as being separate from the controller 14, but it will be appreciated that these and other features illustrated in FIG. 1 could be integrated into a single unit such as within the controller 14. The drive circuit 12 may include a voltage source VS to provide a suitable voltage potential to operate the fuel injector 20, for example 14 Volts. The voltage source VS may be a battery as suggested in the illustration. The battery may be rechargeable, such as a lead acid battery, and the battery may be connected to a vehicle electrical system (not shown) configured to recharge the battery. The drive circuit may also include a switch SW operable connect or disconnect the voltage source VS and the fuel injector 20. The switch SW is preferably a solid state device such as a transistor (e.g.—MOSFET, IGBT), but could be a relay or like. The switch SW may be operated by the control signal 18 from the controller 14. The control signal 18 may be a steady signal that holds the switch SW in the closed state for a period of time to influence a desired injection time of the fuel injector 20, or may be a pulse-width-modulated (PWM) signal having a variable duty cycle.

It has been observed that some fuel injectors do not consistently transition from the closed-state to the open-state. For example, some fuel injectors may stick in the closed-state for a period of time before transitioning to the open-state, and so the amount of fuel dispensed by the fuel injector may be reduced as a result of this transition delay. Fuel injectors equipped with an elastomer seal (not shown) as part of pintle-seat arrangement 22 have been observed to be more susceptible to transition delay than fuel injectors that do not have elastomer seals. Fuel injectors for dispensing gaseous fuel such as compressed natural gas (CNG) are sometimes equipped with elastomer seals to reduce the risk of fuel leaking while in the closed-state. It has also been observed that some fuel injectors may be more prone to exhibiting the transition delay when ambient temperatures are relatively low, less than −20 degrees Celsius for example. It has also been observed that some fuel injectors are more prone to exhibiting transition delay if the voltage applied to the fuel injector is lower than normal, such as less than 10 Volts which may occur during engine cranking when starting an engine.

The problem of transition delay causing inaccurate fuel metering by the fuel injector may be solved by the system 10 being equipped with a sensing device 24 configured to provide a transition signal indicative of the fuel injector 20 transitioning from the closed-state to the open-state. If the transition signal is provided, then the controller 14 may be configured to determine the control signal 18 based on the transition signal. For example, if the fuel injector 20 exhibits transition delay while transitioning from the closed-state to the open-state, the control signal 18 may be adjusted to hold the injector in the open-state longer so the proper amount of fuel is dispensed by the fuel injector 20. As another example, if no transition signal is detected because the injector is stuck in the closed-state, the control signal 18 is cycled, optionally more rapidly than the normal engine injector firing frequency, in order to overcome any stiction between the pintle-seat arrangement 22.

Some systems may be configured to dispense a secondary fuel, for example a liquid fuel as an alternative to a gaseous fuel, and so be equipped with a secondary fuel injector (not shown) in addition to the fuel injector 20. Then if no transition signal is detected, or if conditions are such that the secondary fuel is preferable (e.g. low ambient temperature), controller 14 may be configured to dispense the secondary fuel until conditions change (e.g. the engine warms up), or a transition signal from the fuel injector 20 is observed a the result of 'testing' the fuel injector 20 until a transition signal is detected. In addition, if a pre-determined amount of time elapses, or a pre-determined number of attempts to operate the fuel injector 20 are executed without a transition signal being detected, controller 14 may be configured notify the vehicle operator that it has detected a fault in the fueling system, by, for example, illuminating a service-engine indicator. Furthermore, controller 14 may be configured to provide diagnostic information via a diagnostic device (not shown) when prompted by a service technician.

In one embodiment, the sensing device 24 may be a current sensor 26 arranged to measure injector current I, for example a 0.1 Ohm resistor R1 arranged in series with an injector coil 16 of the fuel injector 20. Alternative ways of measuring current are well known, such as Hall effect sensors. The current sensor 26 is generally configured to output a current signal 28 to the controller 14, for example to an analog-to-digital convertor ADC within the controller 14. As will be explained in more detail below, the transition signal may be based on an injector current I as indicated by the current signal 28. In another embodiment the sensing device 24 may be a pressure sensor 30 outputting a pressure signal 32, and as will be explained below the transition signal may be based on a fuel pressure P indicated by the pressure signal 32. In yet another embodiment the sensing device 24 may include both the current sensor 26 and the pressure sensor 30, and the transition signal may be based on either or both the current signal 28 and the pressure signal 32.

Figure 2:
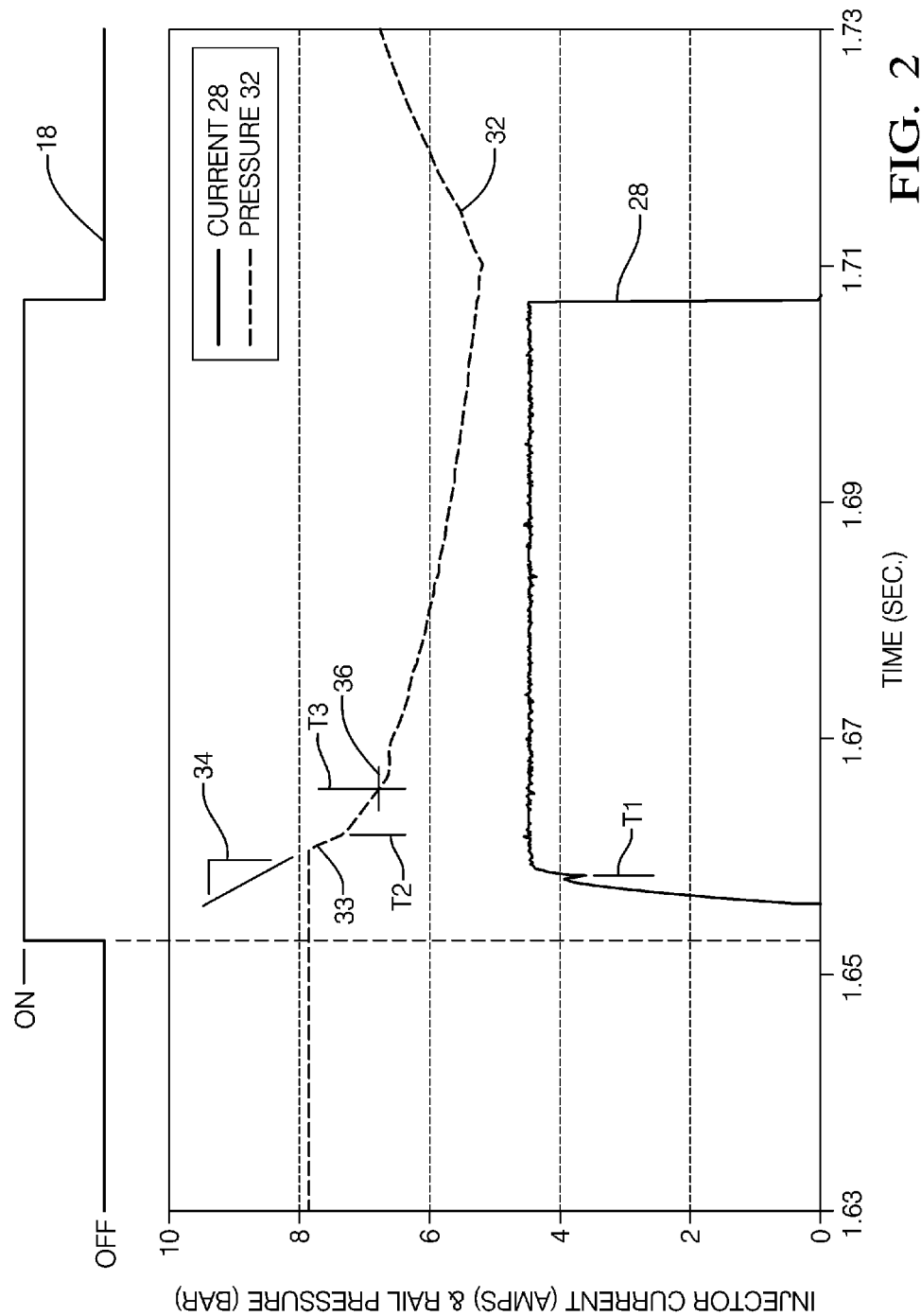
FIG. 2 is a graph of signals present in FIG. 1 in accordance with one embodiment.

FIG. 2 illustrates a non-limiting graphical depiction of a control signal 18 output by the controller 14, and a typical current signal 28 and pressure signal 32 occurring in response to the control signal 18. The timing of the control signal 18 transition from OFF to ON is a non-limiting example for the purposes of explanation. Three example transition signals T1, T2 and T3 are illustrated. The three transition signals are illustrated as occurring at different moments in time only for the purposes of explanation, and may under certain circumstances occur at the same moment in time, or in a different relative order.

A first transition time T1 is illustrated as corresponding to an inflection in the current signal 28. The inflection may be detected by determining a current signal slope of the current signal 28, and determining that the time that the first transition signal T1 occurs corresponds to the moment when the current signal slope is less than a current slope threshold, for example less than zero (i.e.—a negative slope). Alternatively, the first transition signal T1 may be determined to correspond to the moment when the current signal slope changes to a positive slope following the momentary negative slope illustrated. While not subscribing to any particular theory, it is believed that the movement of the valve surrounded by the injector coil 16 induces a voltage that opposes the supply voltage VS and so causes a momentary decrease in the injector current I.

When the fuel injector 20 transitions from the closed-state to the open-state, a corresponding decrease in fuel pressure P of fuel supplied to the fuel injector 20 has been observed. A second transition time T2 is illustrated as corresponding to a point in time when the pressure signal 32 exhibits a pressure signal slope 33 less than a pressure slope threshold 34. Alternatively, the second transition time T2 may be when the pressure signal slope 33 is less than the pressure slope threshold 34 for a predetermined period of time. By requiring that the pressure signal slope remain less than the pressure slope threshold 34 for a period of time, transient noise in the pressure signal or pressure signal slope can be filtered or ignored.

Alternatively, instead of examining the pressure signal slope, the controller 14 simply compare the value of the pressure signal 32 to a pressure value threshold 36, and may indicate that at third transition signal T3 has occurred when the pressure signal value is less than a pressure value threshold 36. Also, the controller 14 may indicate that a transition signal has occurred when both the pressure signal slope 33 is less than a pressure slope threshold 34 and the pressure signal value is less than the pressure value threshold 36.

In another embodiment the system may have both the current sensor 26 and the pressure sensor 30. For this case the transition signal may be based on both injector current I and fuel pressure P. As such, for this example, the system 10 may be equipped with a sensing device 24 that outputs a current signal 28 characterized as having a current signal slope, and outputs a pressure signal 32 characterized as having a pressure signal slope and a pressure signal value. Then a transition signal may be indicated by any combination of the current signal slope being less than a current slope threshold, or the current signal slope becoming positive following a period of negative slope (T1), and/or the pressure signal slope 33 being less than a pressure slope threshold 34 (T2), and/or the pressure signal value being less than a pressure value threshold 36 (T3).

The controller 14 may include a processor such as a microprocessor or other control circuitry as should be evident to those in the art. The controller 14 may include memory, including non-volatile memory, such as electrically erasable programmable read-only memory (EEPROM) for storing one or more routines, thresholds and captured data. The one or more routines may be executed by the processor to perform steps for determining if signals received by the controller 14 for controlling the fuel injector 20 as described herein. The controller 14 may also include a control signal output configured to output the control signal 18 for operating the fuel injector to a closed-state and an open-state. The controller 14 may also include a sensor signal input such as the analog-to-digital convertor ADC illustrated that is configured to receive a transition signal indicative of a fuel injector transition from the closed-state to the open-state. The processor may also be configured to determine or adapt the control signal 18 based on the transition signal T1, T2, and/or T3.

Figure 3:
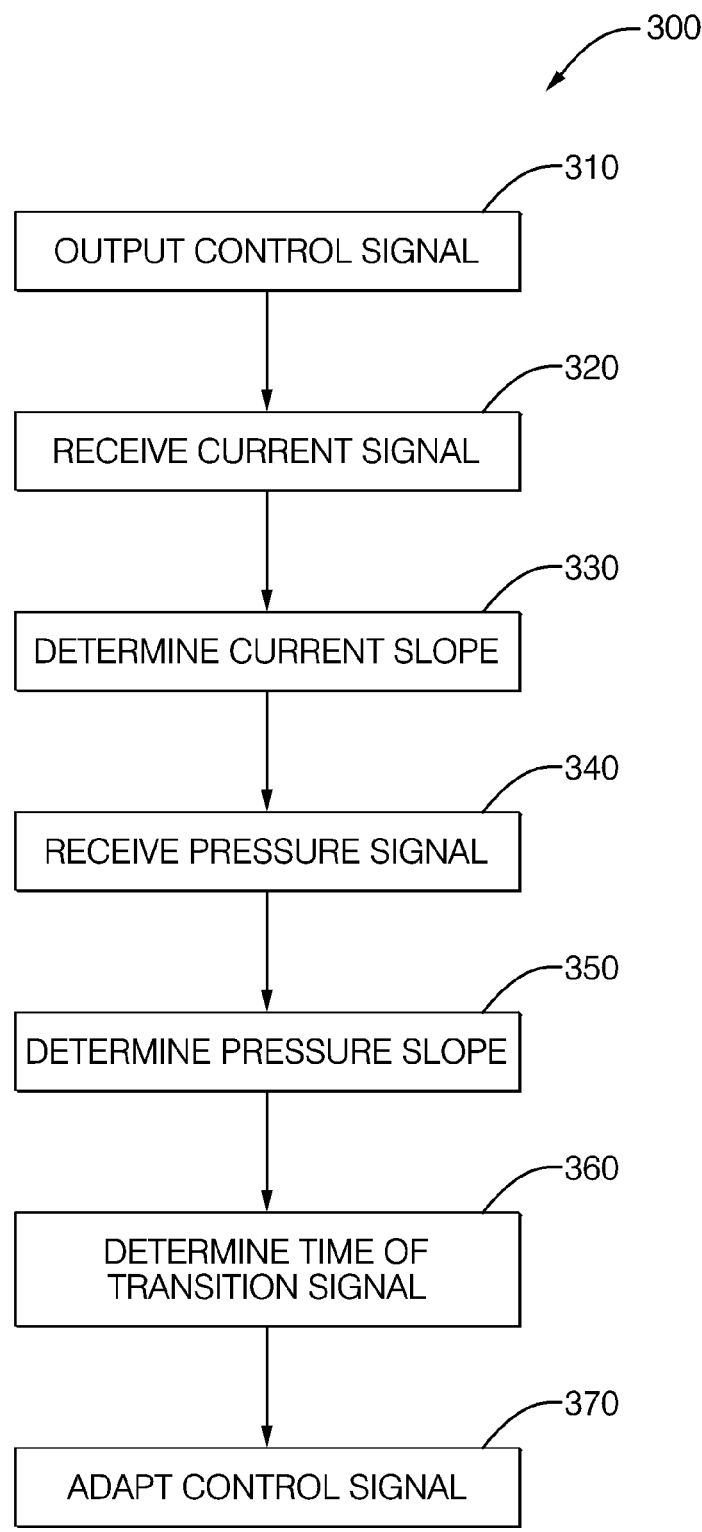
FIG. 3 is flowchart of a method of operating the system of FIG. 1 in accordance with one embodiment.

FIG. 3 illustrates a method 300 of controlling a fuel injector. Step 310, OUTPUT CONTROL SIGNAL, may include outputting a control signal 18 by the controller 14 to operate the fuel injector 20 from the closed-state to the open-state.

Step 320, RECEIVE CURRENT SIGNAL, may include receiving a first transition signal T1 indicative of a fuel injector transition from the closed-state to the open-state based on injector current I as indicated by current signal 28

Step 330, DETERMINE CURRENT SLOPE, may include determining when the first transition signal T1 occurs by determining when a slope of a current signal 28 has a current slope value less than a current slope threshold, for example zero. Step 330 may also include determining that the current slope has changed by an amount greater than a current slope change threshold, for example when the current slope changes from negative to positive.

Step 340, RECEIVE PRESSURE SIGNAL, may include receiving a second transition signal T2 and or a third transition signal T3 indicative of a fuel injector transition from the closed-state to the open-state based on fuel pressure P as indicated by pressure signal 32.

Step 350, DETERMINE PRESSURE SLOPE, may include determining when the second transition signal T2 occurs based on when a slope of the pressure signal 32 has a slope value 33 less than a slope threshold 34.

Step 360, DETERMINE TIME OF TRANSITION SIGNAL, may include determine the time when any one of the transition signals T1, T2, or T3 occurs, or the time when all of the transition signals T1, T2, and T3 have occurred.

Step 370, ADAPT CONTROL SIGNAL, may include adapting the control signal 18 based on the transition signal T1, T2 and/or T3. Adapting the control signal 18 may include extending the ON time of the control signal in response to detecting that an opening delay or transition delay of the fuel injector 20 has occurred.

Accordingly, a fuel injector control system 10, a controller 14 for the fuel injector control system 10 and a method 300 of controlling a fuel injector 20 are provided. By sensing a time when the fuel injector 20 actually transitions from the closed-state to the open-state, the control signal 18 can be compensated or adapted so the desired amount of fuel is dispensed by the fuel injector 20 even if the transition time is abnormally delayed. The slope of the current signal 28 may be used to detect the transition moment because of the observed inflection in the current signal 28 corresponding to the fuel injector opening. The fuel pressure signal 32 may also be used to estimate when the fuel injector 20 actually opens. While some fuel injector designs and/or operating conditions have opening characteristics that are repeatable enough that determining a transition time based on a transition signal (T1, T2, T3) is not necessary, certain injectors and certain operating conditions may warrant determining a transition time so fuel is accurately dispensed.

While this invention has been described in terms of the preferred embodiments thereof, it is not intended to be so limited, but rather only to the extent set forth in the claims that follow.

I claim:

1. A fuel injector control system, said system comprising:
a fuel injector configured to respond to a control signal for operating the fuel injector to a closed-state and an open-state;
a sensing device configured to provide a transition signal indicative of a time when the fuel injector transitions from the closed-state to the open-state, wherein the transition signal is based on injector current; and
a controller configured to determine the control signal based on the transition signal.

2. The system in accordance with claim 1, wherein the fuel injector includes a pintle-seat arrangement that includes an elastomer seal.

3. The system in accordance with claim 1, wherein the fuel dispensed by the fuel injector is gaseous.

4. The system in accordance with claim 1, wherein the sensing device outputs a current signal characterized as having a current signal slope, wherein the transition signal is indicated when the current signal slope is less than a current slope threshold.

5. The system in accordance with claim 1, wherein the transition signal is based on fuel pressure.

6. The system in accordance with claim 5, wherein the sensing device outputs a pressure signal characterized as having a pressure signal slope, wherein the transition signal is indicated when the pressure signal slope is less than a pressure slope threshold.

7. The system in accordance with claim 5, wherein the sensing device outputs a pressure signal characterized as having a pressure signal value, wherein the transition signal is indicated when the pressure signal value is less than a pressure value threshold.

8. The system in accordance with claim 1, wherein the transition signal is based on injector current and fuel pressure.

9. The system in accordance with claim 8, wherein the sensing device outputs a current signal characterized as having a current signal slope and outputs a pressure signal characterized as having a pressure signal slope and a pressure signal value, wherein the transition signal is indicated when the current signal slope is less than a current slope threshold, the pressure signal slope is less than a pressure slope threshold, and the pressure signal value is less than a pressure value threshold.

10. The system in accordance with claim 1, wherein the controller determines the control signal based on the transition signal if an ambient temperature is less than an ambient temperature threshold.

11. A controller for controlling a fuel injector, said controller comprising:
a control signal output configured to output a control signal for operating the fuel injector to a closed-state and an open-state;
a sensor signal input configured to receive a transition signal indicative of a time when the fuel injector transitions from the closed-state to the open-state, wherein the transition signal is based on injector current; and
a processor configured to determine the control signal based on the transition signal.

12. A method of controlling a fuel injector, said method comprising the steps of:
outputting a control signal to operate the fuel injector to a closed-state and an open-state;
receiving a transition signal indicative of a time when the fuel injector transitions from the closed-state to the open-state, wherein the transition signal is based on injector current; and
adapting the control signal based on the transition signal.

13. The method in accordance with claim 12, wherein the method includes the step of determining when the transition signal occurs.

14. The method in accordance with claim 13, wherein the step of determining when the transition signal occurs includes determining a slope of a sensor signal.

15. The method in accordance with claim 14, wherein the step of determining when the transition signal occurs includes determining that the slope has a slope value greater than a slope threshold.

16. The method in accordance with claim 14, wherein the step of determining when the transition signal occurs includes determining that the slope has changed by an amount greater than a slope change threshold.

17. The method in accordance with claim 13, wherein the step of determining when the transition signal occurs includes determining a value of a sensor signal and that the sensor signal has a value greater than a threshold value.

* * * * *